Feb. 18, 1958  R. O. ELDER  2,824,051
PREPARATION OF SUBSTANTIALLY ANHYDROUS FORMALDEHYDE
BY A PARTIAL CONDENSATION PROCESS
Filed Sept. 16, 1954
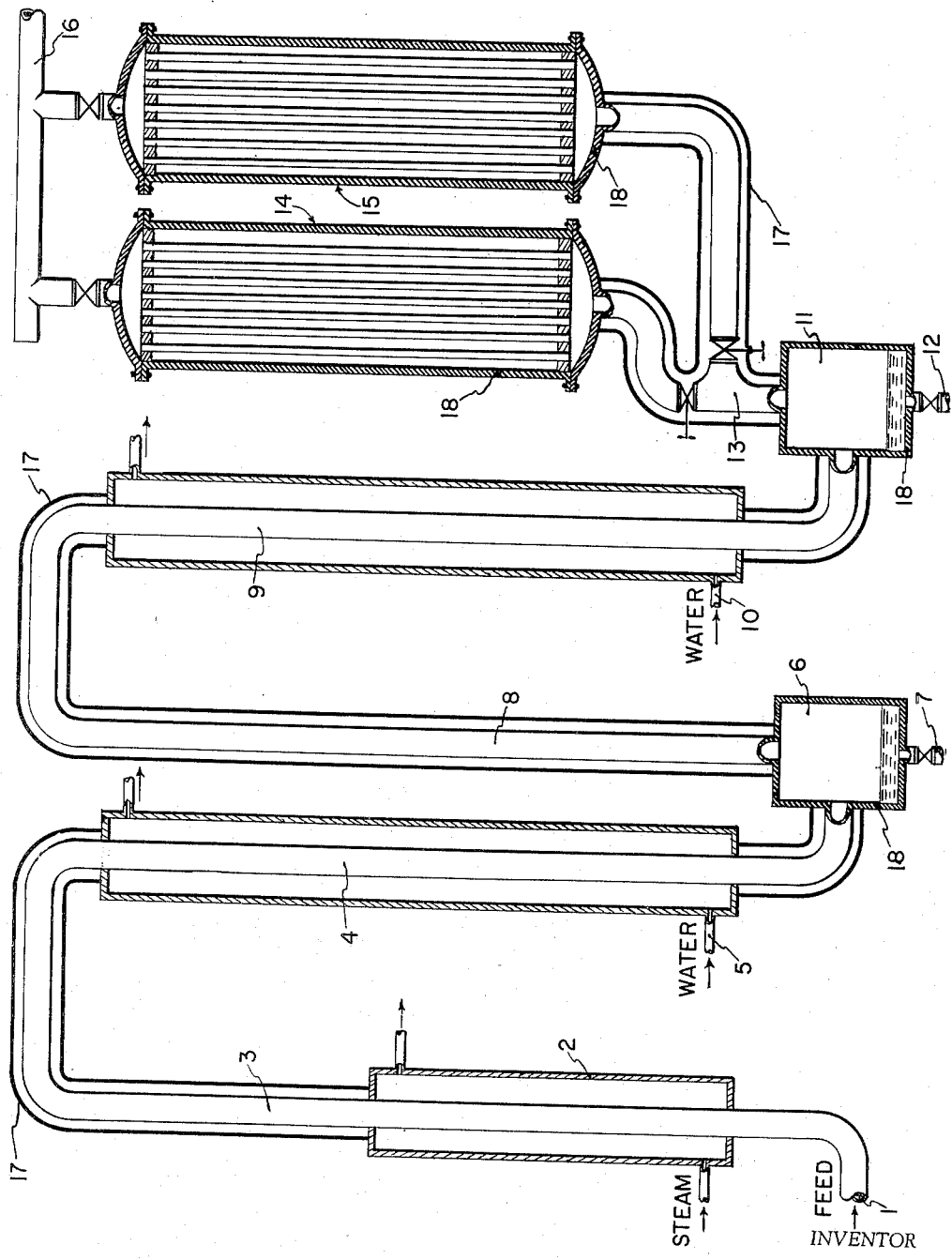
INVENTOR
RICHARD OLIVER ELDER
BY
ATTORNEY

United States Patent Office 2,824,051
Patented Feb. 18, 1958

2,824,051

PREPARATION OF SUBSTANTIALLY ANHYDROUS FORMALDEHYDE BY A PARTIAL CONDENSATION PROCESS

Richard Oliver Elder, Orange, Tex., assignor to E. I. du Pont de Nemours and Company, Wilmington, Del., a corporation of Delaware Application September 16, 1954, Serial No. 456,561

2 Claims. (Cl. 202—69)

This invention relates to the preparation of high quality, substantially anhydrous formaldehyde, and particularly to the preparation of such pure formaldehyde by a process of stagewise partial condensation high molecular weight polymeric formaldehyde.

It is well known that formaldehyde is extremely reactive and that as aqueous formaldehyde solutions are dehydrated, a solid low molecular weight polymer of formaldehyde, known as paraformaldehyde, is formed which may contain as much as 7% water and other impurities. It is also known that low molecular weight polymers of formaldehyde such as paraformaldehyde or alpha-polyoxymethylene may be pyrolyzed to produce formaldehyde of about 5–7% water content. These sources of formaldehyde are relatively expensive, and a pyrolysis process is much more cumbersome than a distillation process when large amounts of pure formaldehyde are required.

In copending application Serial No. 433,305, filed by D. L. Funck on May 28, 1954, there is described a process for preparing a high purity formaldehyde by reacting impure formaldehyde with an alcohol to produce a hemiformal, dehydration of the hemiformal, and finally, decomposing the hemiformal to recover a purified formaldehyde. Such a process produces a high quality, substantially anhydrous product, and the process of this invention is intended to be an alternative means of producing a highly purified formaldehyde.

At first appearances the obvious method for preparing pure formaldehyde would seem to be the distillation of aqueous formaldehyde solutions. Many prior art research workers have attempted to employ this procedure but their efforts have been thwarted by the spontaneous formation of paraformaldehyde or the reaction of formaldehyde with water and other impurities to produce compounds which are undesirable.

It is an object of this invention to provide a process for the preparation of high quality formaldehyde monomer from an aqueous solution of formaldehyde. It is another object of this invention to prepare substantially anhydrous formaldehyde monomer by means of a process which takes advantage of the relatively high vapor pressure of pure monomeric formaldehyde. It is still another object of this invention to produce monomeric formaldehyde vapor of less than 0.1% water content. It is yet another object of this invention to provide a continuous process for preparing highly purified formaldehyde vapors.

The above objects are accomplished by subjecting the vapors of an aqueous formaldehyde solution to a two-stage partial condensation at atmospheric pressure, or slightly above, followed by a partial polymerization of the vapors from the second-stage condenser. The combination of these steps has been effective in producing formaldehyde monomer containing less than 0.05% by weight of water.

A better understanding of the process of this invention may be had by reference to the accompanying drawing.

An aqueous formaldehyde feed is pumped into the process at 1. A formaldehyde solution, containing about 50% to 60% by weight of formaldehyde, is the preferred raw material, although by altering the equipment slightly and by modifying the reaction conditions feed material having different formaldehyde concentrations may be used. The liquid feed stream at 1 is led through a vaporizer 2 in which sufficient heat is absorbed by the feed stream to transform the entire liquid stream to the vapor phase at 3. Vaporizer 2 may be heated by steam or other known means, and may consist of one or a group of tubes connected in parallel or series.

The vaporized formaldehyde stream at 3 has a pressure which is sufficient to overcome frictional forces acting on the flowing stream, usually about 2 pounds per square inch gauge, and a temperature of about 120°–130° C. Higher pressures are operable, although in most embodiments of this invention, pressures slightly above atmospheric are preferred. At such a pressure and temperature the stream enters the first-stage partial condenser 4 in which sufficient heat is extracted from the passing vapors to condense part of the vapors. A condensate is obtained which is rich in water as compared to the feed stream. The first-stage condenser may be cooled by water flowing through a jacket 5 surrounding the condenser. The condensate/vapor mixture leaving the first-stage condenser is led into receiver 6 where the condensate separates from the uncondensed vapors. The condensate is removed through outlet 7.

The vapor at 8 is then conducted to the inlet of the second-stage condenser 9. Water or other coolant is introduced at 10 and leaves the opposite end of the cooling jacket. The vapors at 9 are partially condensed and flow into receiver 11 where the condensate separates from the uncondensed vapors, the condensate being drawn off at 12. A condensate is obtained which is rich in water compared to the mixture entering this condenser. The condensate drawn off at 12 may be recirculated back to the system by mixing with the feed stream at 1. The condensate drawn off at 7 is reconcentrated by known means not shown back to feed stream concentration and mixed with feed stream at 1.

The vapors at 13 are then led into a prepolymerizer where the amount of water and other impurities is reduced to a desirable level. In the drawing there are shown two identical prepolymerizers, 14 and 15, connected in parallel between inlet 13 and outlet 16. In normal operation only one prepolymerizer is used while the other is cleaned out. Cleaning may be accomplished by blowing live steam through the partially plugged tubes causing the deposited solid to decompose and dissolve to form an aqueous formaldehyde solution, which in turn may be concentrated or diluted by known means and mixed with the feed stream at 1. The prepolymerizers, 14 and 15, are identical and consist of a bundle of tubes which are cooled from the outside, and through the inside of which the formaldehyde vapors pass. The tubes are maintained at a low temperature by coolant circulating around the tubes. A small amount of a solid low molecular weight polymer of formaldehyde forms on the inside surface of the cold tubes, and in so doing, a large portion of the remaining water is removed from the formaldehyde vapor passing through the prepolymerizer. At 16, the vapors leaving the prepolymerizer contain about 99.2% to 99.7% formaldehyde and about 0.02% to about 0.05% water.

Because the formaldehyde vapors might prematurely polymerize in the lines conducting formaldehyde vapors from vaporizer 2 through partial condensers 4 and 9 and receivers 6 and 11 to prepolymerizers 14 and 15, and thus cause plugging in the lines, all open lines are shown as being covered with heating means 17 to prevent cooling and possible polymerization of the vapors. Any heating means is suitable, e. g., steam jackets, electric resistance heating, and other means well known to technicians. Condensers 6 and 11 as well as prepolymerizers 14 and 15 are fitted with suitable insulation to allow the maintenance of the proper temperature in that particular piece of apparatus.

In addition to the water there are many other impurities which may be present in the feed stream and which may be formed by chemical reaction between components in the feed stream. For example, formic acid, methanol, methyl formate, and methylal are known to be present in aqueous formaldehyde solutions. In the process of this invention all of these four impurities are reduced in concentration to a desirably low level.

Several process techniques have been found to be desirable in obtaining optimum yields and quality, and in minimizing by-product formation. The following points are suggested as useful guides in the preferred operation of this process:

(1) It is desirable to minimize the time during which the vapors and the liquid condensate are in contact in the condensers, since longer contact times favor the dissolving of formaldehyde vapors in the condensate and thus reducing yields. Under extremely long contact times the condensate may become sufficiently concentrated with formaldehyde to result in the formation of solid, low molecular weight polymers in the condenser.

(2) The condensate should be separated from the vapors in any way which minimizes turbulence and intimate mixing of the vapor and condensate for the same reason as stated in (1) above.

(3) The presence of formic acid during condensation is not desirable and everything should be done to maintain the concentration of formic acid at the lowest level. The presence of formic acid tends to reduce the condensation rate of water and to catalyze the formation of methylene glycol and polyoxymethylene glycols, and such effects are all undesirable in that they reduce the efficiency of the process and the yield of pure formaldehyde. One way of reducing the formic acid concentration is to purify the feed stream. A second way of reducing formic acid content is to maintain conditions which do not favor the Cannizzaro reaction:

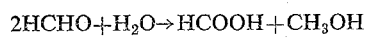

$$2HCHO + H_2O \rightarrow HCOOH + CH_3OH$$

Since the Cannizzaro reaction is surface-catalyzed and the reaction rate increases at higher temperatures, this reaction can be slowed down by maintaining a very short contact time in the vaporizer (2 in the attached drawing) and at the same time keeping the surface temperature of the vaporizer as low as possible.

(4) Better yields are obtained by operating the partial condensers at the lowest practical surface temperatures. Heat-transfer efficiency is improved by utilizing low surface temperature, and furthermore under such conditions the water condenses more readily to form a wet film over the surfaces which in turn helps to prevent a buildup of polymer solids on the walls. Where there is no condensate to wet the walls, such as is the case in the lines leading into and away from the condensers, the formation of solid polymer on the surfaces of the lines is prevented by heating the lines to about 70°–130° C.

(5) The flow of vapors and condensate is cocurrent in the condensers so that liquid condensate will wet the walls by gravity flow and prevent the formation of solid polymers. The flow of vapors and condensate is countercurrent in the prepolymerizer in that vapors enter at the bottom and the condensate which forms flows by gravity toward the vapor entrance and forms a solid polymer on the dry walls of the tubes in the prepolymerizer.

The above recommendations are not intended to limit this invention but are intended to illustrate the preferred mode of operation of the process of this invention.

In the following example parts and percentages are by weight unless otherwise specified.

*Example.*—In a series of experimental operations, the process of this invention was proven to be successful in producing the highly purified formaldehyde described herein. The vaporizer consisted of two steam jacketed copper tubes 0.364 inch inside diameter, 4 feet long connected in parallel; the first-stage condenser was a copper tube 0.432 inch inside diameter, 8.75 feet long; the second-stage condenser was a copper tube 0.2485 inch inside diameter, 8.0 feet long, and the prepolymerizer was a shell-and-tube heat exchanger containing 46 stainless steel tubes each 0.281 inch inside diameter and 2 feet long connected in parallel with a tube sheet at each end of the tubes.

A gear pump forced the liquid feed, at a temperature of 65–70° C. and a rate of 28–32 pounds per hour, into the vaporizer which was heated by steam at 135–165° C. Vapor leaving the vaporizer had a pressure of about 2 pounds per square inch gauge and a temperature of about 115° C. The vapor line connecting the vaporizer outlet to the first-stage condenser inlet was heated by steam in a jacket covering the vapor line causing the formaldehyde vapors entering the first-stage condenser to be at a temperature of about 120°–130° C.

The condenser 4 was cooled by a water jacket in which coolant flowed countercurrently with respect to the condensing vapors. Cooling water entered the jacket at a temperature of 35–40° C. and left the opposite end of the jacket at 45–50° C. A mixture of vapors and condensate at 65° C. flowed from the condenser to the first-stage receiver where the liquid condensate was trapped and removed and the vapor proceeded to the second-stage condenser. The condensate was formed and removed at a rate of 21–23 pounds per hour. The percentage recovery of formaldehyde, as vapor, through the first-stage condenser was 40–43%, this figure being calculated by dividing the amount of formaldehyde in the vapor leaving the first-stage receiver by the amount of formaldehyde entering the first-stage condenser. The vapor line between the first-stage receiver and the second-stage condenser was heated by steam in a jacket surrounding the line. The vapor entering the second-stage condenser was at a temperature of about 105° C., and was flowing at a rate of 7–9 pounds per hour.

The second-stage condenser was cooled by water flowing countercurrently with respect to the condensing vapors. Water entered the cooling jacket at about 10° C. and left the opposite end of the jacket at about 15° C. A mixture of vapor and condensate at 35° C. flowed from the condenser to the second-stage receiver where the liquid was collected and removed at a rate of 3–4 pounds per hour. The percentage recovery of formaldehyde, as vapor, passing through the second-stage condenser and receiver was 67–73%. Vapors leaving the second-stage receiver were heated by steam in a jacket surrounding the vapor line so that the vapors entering the prepolymerizer were at a temperature of 70° C. to 90° C. and flowing at a rate of 4–5 pounds per hour.

The prepolymerizer was cooled with heptane flowing concurrently with the formaldehyde vapors, the coolant entering the prepolymerizer at a temperature of about −20° C. to −15° C. and leaving at a temperature of about −17° C. to −12° C. About 15% of the formaldehyde vapors formed a solid product on the inside of the tubes in the prepolymerizer, the remainder of the vapor leaving the prepolymerizer at a rate of about 3.8–4.2 pounds per hour and a temperature of 0° to 20° C. The percentage recovery of the formaldehyde passing through the prepolymerizer was about 85%.

In the table there are shown analyses of streams at various points in the above-described process. Percentages given are based on the total weight of the stream sample. "Acid" and "Ester" are those components found by analysis to be either an acid or an ester but which are assumed to be formic acid and methyl formate, respectively.

Table

|  | Feed | Liquid in First-Stage Condensate Receiver | Vapor Leaving First-Stage Condensate Receiver [1] | Liquid in Second-Stage Condensate Receiver | Vapor Leaving Second-Stage Condensate Receiver | Vapor Leaving Prepolymerizer |
|---|---|---|---|---|---|---|
| Formaldehyde........percent.. | 50-60 | 42-45 | 85-90 | 65-68 | 97-99 | 99.2-99.7 |
| Water....................do.... | 48-38 | 57-52 | 8-12 | 33-28 | 0.5-1.5 | 0.02-0.05 |
| Acid.....................do.... | 0.08-0.15 | 0.15-0.2 | 0.01-0.04 | 0.06-0.15 | 0.004-0.01 | 0.0005-0.0015 |
| Ester....................do.... | 0.005-0.015 | 0.005-0.01 | 0.005-0.01 | 0.005-0.01 | 0.01-0.02 | 0.007-0.02 |
| Methanol.................do.... | 1.3-2.0 | 1.5-2.5 | 0.8-0.9 | 1.5-2.5 | 0.07-0.2 | 0.008-0.025 |
| Methylal.................do.... | 0.5-1.0 | 0.3-1.0 | 0.8-0.9 | 1-1.5 | 0.8-0.9 | 0.3-0.8 |
| Total Flow Rate (pounds per hour)....................... | 28-32 | 21-23 | 7-9 | 3-4 | 4-5 | 3.4-4.2 |

[1] Estimated value.

It is not intended that this process be limited by the particular conditions of concentrations, temperatures, and pressures which have been used in the illustrative example given above. The process conditions of the example are the result of several experiments, and the conditions represent the values for optimum purity and economy. Feed streams of other concentrations may be employed to produce the same purity at a lower recovery, and, on the other hand, if the conditions are changed so as to increase the recovery, the purity of the final product will be lower. In general, however, feed streams of 30–60% formaldehyde are operable, concentrations of 50–60% being preferred.

This process is especially designed for pressures which are not below atmospheric pressure, for the reason that vapor pumps or compressors required to raise the pressure to atmospheric are continually plagued with the formation of low molecular weight polymeric formaldehyde on the moving parts of the apparatus. The process of this invention is therefore particularly desirable in that no moving machinery is involved from the time the feed solution enters the vaporizer until the pure formaldehyde exits the prepolymerizers. Although higher pressures are operable, the employment of pressures above about 2 atmospheres absolute does not appear to be advantageous since enough pressure to maintain a flowing system is all that is required for most embodiments of this process.

Lines which are used to convey the formaldehyde vapors from the vaporizer to the first-stage condenser, to the second-stage condenser, and to the prepolymerizer are desirably heated to insure the prevention of polymer formation in the lines. The temperatures must be sufficient to maintain the formaldehyde in the vapor phase. At the beginning of this process the temperature may be from 100° C. to 130° C., while at the entrance to the polymerizer temperatures of 70° C. to 90° C. are generally sufficient.

The prepolymerizer affords a large surface area which contacts the passing formaldehyde vapors. The surfaces are preferably metallic although glass and other materials are operable. The contacting surfaces in the prepolymerizer are maintained at a temperature below 0° C., and preferably at about −15° C. to −20° C. The vapors of formaldehyde and the entrained impurities spontaneously polymerize to a solid, low molecular weight polymer on the cold surfaces. It is desirable that not more than about 20% by weight of the passing vapors polymerize, although it is necessary that some small amount polymerizes so as to remove the major portion of the remaining water and some other impurities.

It is not intended that this process be limited to the employment of two and only two condensers, since in some embodiments it may be advantageous to use three or more condensers in series to prepare a special product. The product of this process may be a vapor as shown herein, or it may be condensed to form a liquid. In either case, such a product is highly desirable in any of a variety of reactions wherein a highly purified formaldehyde is advantageous.

I claim:

1. A process for producing substantially anhydrous formaldehyde comprising vaporizing a liquid feed solution containing 50–60% by weight of formaldehyde and 48–38% by weight of water to form a vapor at an absolute pressure of one to two atmospheres and a temperature of 115°–130° C., partially condensing about 75% of said vapor to form a first vapor product and a first liquid product, removing the first liquid product, heating the first vapor product to a temperature of about 90°–105° C., partially condensing about 40% of said first vapor product to form a second liquid product and a second vapor product, removing the second liquid product, heating the second vapor product to about 70° C. to 90° C., allowing the heated second vapor product to contact a surface maintained at about −20° C. to −15° C. and allowing some minor portion, but not more than about 20% of the contacting vapor to polymerize and recovering a third product containing at least 99.2% by weight of formaldehyde and not more than about 0.05% water.

2. A process for producing substantially anhydrous formaldehyde comprising vaporizing a feed stream of aqueous formaldehyde containing 30% to 60% by weight of formaldehyde, passing the vapors at an absolute pressure of 1–2 atmospheres through a series of partial condensation stages, while preventing polymerization of the vapor, collecting and removing from the process an aqueous condensate from each of said stages, passing the stream of concentrated formaldehyde vapor leaving the final partial condensation stage of said series into contact with a cold surface, polymerizing some minor portion which is less than 20% by weight of said vapor into a solid polymer of formaldehyde, water, and impurities, and recovering the unpolymerized portion of said vapor after contact with said cold surface as a vapor fraction containing at least 99.2% formaldehyde.

References Cited in the file of this patent

UNITED STATES PATENTS 2,529,622    Michael _____ Nov. 14, 1950
2,675,346    MacLean _____ Apr. 13, 1954

OTHER REFERENCES

Industrial and Engineering Chemistry, vol. 41, pages 1277–1286 (1949), "Distillation Principles of Formaldehyde Solutions," by Hall and Piret.

Industrial and Engineering Chemistry, vol. 40, pages 661–672 (1948), "Distillation Principles of Formaldehyde Solutions," Piret and Hall.